United States Patent [19]

DeSimone

[11] Patent Number: 5,539,861
[45] Date of Patent: Jul. 23, 1996

[54] SPEECH RECOGNITION USING BIO-SIGNALS

[75] Inventor: Joseph DeSimone, Bradley Beach, N.J.

[73] Assignee: AT&T Corp., Murray Hill, N.J.

[21] Appl. No.: 171,586

[22] Filed: Dec. 22, 1993

[51] Int. Cl.$^6$ .................................................. G10L 5/06
[52] U.S. Cl. .................... 395/2.43; 395/2.52; 395/2.4
[58] Field of Search .................................. 395/2.16, 2.4, 395/2.43, 2.45, 2.46, 2.48, 2.50, 2.52

[56] References Cited

U.S. PATENT DOCUMENTS

| | | | |
|---|---|---|---|
| 4,139,732 | 2/1979 | Fourcin | 395/2.85 |
| 4,256,924 | 3/1981 | Sakoe | 395/2.5 |
| 4,390,756 | 6/1983 | Hoffmann et al. | 179/107 |
| 4,611,596 | 9/1986 | Wasserman | 607/57 |
| 4,718,096 | 1/1988 | Meisel | 381/43 |
| 4,894,777 | 1/1990 | Negishi et al. | 364/419 |
| 4,901,354 | 2/1990 | Gollmar et al. | 381/110 |
| 5,092,343 | 3/1992 | Spitzer et al. | 128/733 |
| 5,171,930 | 12/1992 | Teaney | 84/725 |

FOREIGN PATENT DOCUMENTS 0504485  9/1992  European Pat. Off. .
0538626  4/1993  European Pat. Off. .

OTHER PUBLICATIONS

R. Benjamin Knapp, et al., "A Real–Time Digital Processing System for Bioelectric Control of Music," ICASSP '88, Sep. 1988 pp. 2256–2257.

Database WPIL, No. 92–380730 Derwent Publications Ltd., London; & TP-A-109204 (Anonymous), Abstract.

European Search Report dated Apr. 10, 1995, regarding EPO Application No. EP 94 308994.6.

Primary Examiner—Allen R. MacDonald
Assistant Examiner—Thomas J. Onka
Attorney, Agent, or Firm—Christopher N. Malvone

[57] ABSTRACT

The recognition rate of a speech recognition system is improved by compensating for changes in the user's speech that result from factors such as emotion, anxiety or fatigue. A speech signal derived from a user's utterance is modified by a preprocessor and provided to a speech recognition system to improve the recognition rate. The speech signal is modified based on a bio-signal which is indicative of the user's emotional state.

24 Claims, 3 Drawing Sheets

SPEECH RECOGNITION USING BIO-SIGNALS

CROSS REFERENCE TO RELATED APPLICATIONS

Related subject matter is disclosed in the applications filed concurrently herewith and assigned to the same assignee hereof entitled "Speech Recognition Training Using Ser. No. 08/171,585 Bio-Signals and "Improved Speech Recognition Using Bio-Signals" Ser. No. 08/171,584.

TECHNICAL FIELD

The present invention relates to speech recognition; more specifically, using bio-signals to increase speech recognition performance.

DESCRIPTION OF THE PRIOR ART

In the past, speech recognition systems were used to control electronic devices such as computers with verbal commands. FIG. 1 illustrates a speech recognition system and includes a personal computer or PC 10, with a display 12, keyboard 14, and an audio/sound card 16 that is inserted into a card slot within PC 10. Microphone 18 is used to provide verbal inputs to audio card 16. Audio card 16 can be an audio card such as a card sold under the trade name (SPEECH COMMANDER) by Verbex Voice Systems, Inc.

In addition to using audio card 16, PC 10 runs software packages sold under the trade names (LISTEN) by Verbex Voice Systems, Inc., and (WINDOWS) by Microsoft Corporation to provide verbal control of PC 10's actions using speech recognition. These systems are operated by training the system to recognize a word or utterance by speaking the utterance into microphone 18 while the recognition system is in a training mode. Afterwards, the system recognizes utterances that were spoken during the training mode, and executes the commands corresponding to the utterances.

During a normal day's work, a user's voice may vary due to changes in the user's emotional state or due to the user becoming fatigued. These changes in the user's voice characteristics reduce the recognition rate, increased computer errors and result in user frustration and reduced productivity.

SUMMARY OF THE INVENTION

An embodiment of the present invention compensates for variations in a speech signal that are introduced by factors such as the speaker's emotional state or fatigue by using bio-signals to process the speech signal. For example, when a user becomes excited, the pitch of his/her voice may change and reduce the recognition rate. A bio-monitor is used to create a bio-signal indicative of the emotional change so that a preprocessor can modify the speech signal to compensate for changes in pitch, and thereby increase the recognition rate.

DETAILED DESCRIPTION

Figure 1:
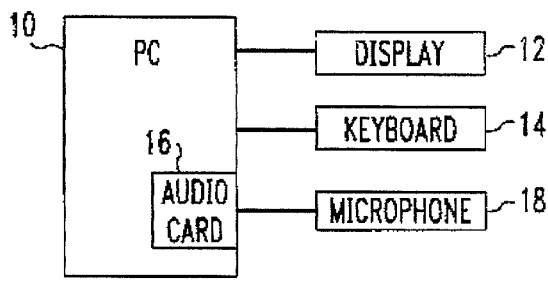
FIG. 1 illustrates a personal computer with an audio card and a microphone.
Figure 2:
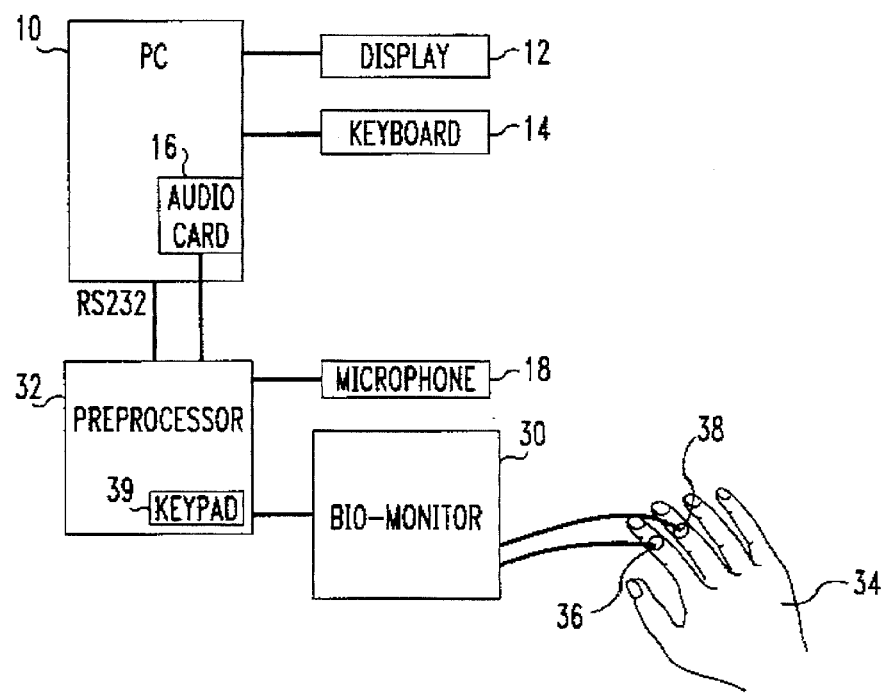
FIG. 2 illustrates a speech recognition system with a bio-monitor and a preprocessor.

FIG. 2 illustrates a speech recognition system where speech signals from microphone 18 and bio-signals from bio-monitor 30 are received by preprocessor 32. The signal from bio-monitor 30 to preprocessor 32 is a bio-signal that is indicative of the impedance between two points on the surface of user 34's skin. Bio-monitor 30 measures the impedance using contact 36 which is attached to one of the user's fingers and contact 38 which is attached to another of the user's fingers. A bio-monitor such as a bio-feedback monitor sold by Radio Shack, which is a division of Tandy Corporation, under the trade name (MICRONATA® BIO-FEEDBACK MONITOR) model number 63-664 may be used. It is also possible to attach the contacts to other positions on the user's skin. When user 34 becomes excited or anxious, the impedance between points 36 and 38 decreases and the decrease is detected by monitor 30 which produces a bio-signal indicative of a decreased impedance. Preprocessor 32 uses the bio-signal from bio-monitor 30 to modify the speech signal received from microphone 18, the speech signal is modified to compensate for the changes in user 34's speech due to changes resulting from factors such as fatigue or a change in emotional state. For example, preprocessor 32 may lower the pitch of the speech signal from microphone 18 when the bio-signal from bio-monitor 30 indicates that user 34 is in an excited state, and preprocessor 32 may increase the pitch of the speech signal from microphone 18 when the bio-signal from bio-monitor 30 indicates that the user is in a less excited state such as when fatigued. Preprocessor 32 then provides the modified speech signal to audio card 16 in a conventional fashion. For purposes such as initialization or calibration, preprocessor 32 may communicate with PC 10 using an interface such as an RS232 interface. User 34 may communicate with preprocessor 32 by observing display 12 and by entering commands using keyboard 14 or keypad 39 or a mouse.

It is also possible to use the bio-signal to preprocess the speech signal by controlling the gain and/or frequency response of microphone 18. The microphone's gain or amplification may be increased or decreased in response to the bio-signal. The bio-signal may also be used to change the frequency response of the microphone. For example, if microphone 18 is a model ATM71 available from AUDIO-TECHNICA U.S., Inc., the bio-signal may be used to switch between a relatively flat response and a rolled-off response, where the rolled-off response provided less gain to low frequency speech signals.

Figure 3:
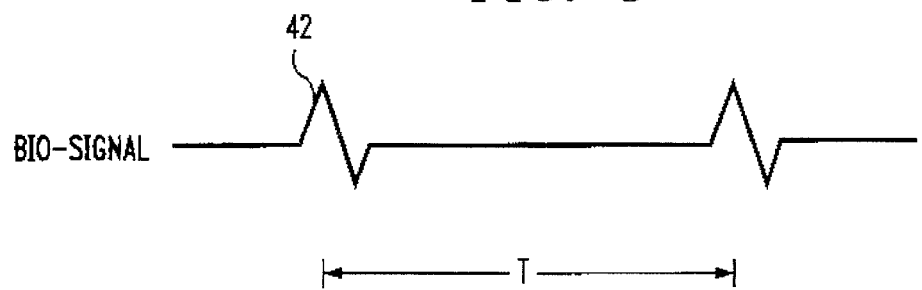
FIG. 3 illustrates a bio-signal produced by the bio-monitor of FIG. 2.

When bio-monitor 30 is the above-referenced monitor available from Radio Shack, the bio-signal is in the form of a series of ramp-like signals, where each ramp is approximately 0.2 m sec. in duration. FIG. 3 illustrates the bio-signal, where a series of ramp-like signals 42 are separated by a time T. The amount of time T between ramps 42 relates to the impedance between points 38 and 36. When the user is in a more excited state, the impedance between points 38 and 36 is decreased and time T is decreased. When the user is in a less excited state, the impedance between points 38 and 36 is increased and the time T is increased.

The form of a bio-signal from a bio-monitor can be in forms other than a series of ramp-like signals. For example, the bio-signal can be an analog signal that varies in periodicity, amplitude and/or frequency based on measurements made by the bio-monitor, or it can be a digital value based on conditions measured by the bio-monitor.

Figure 4:
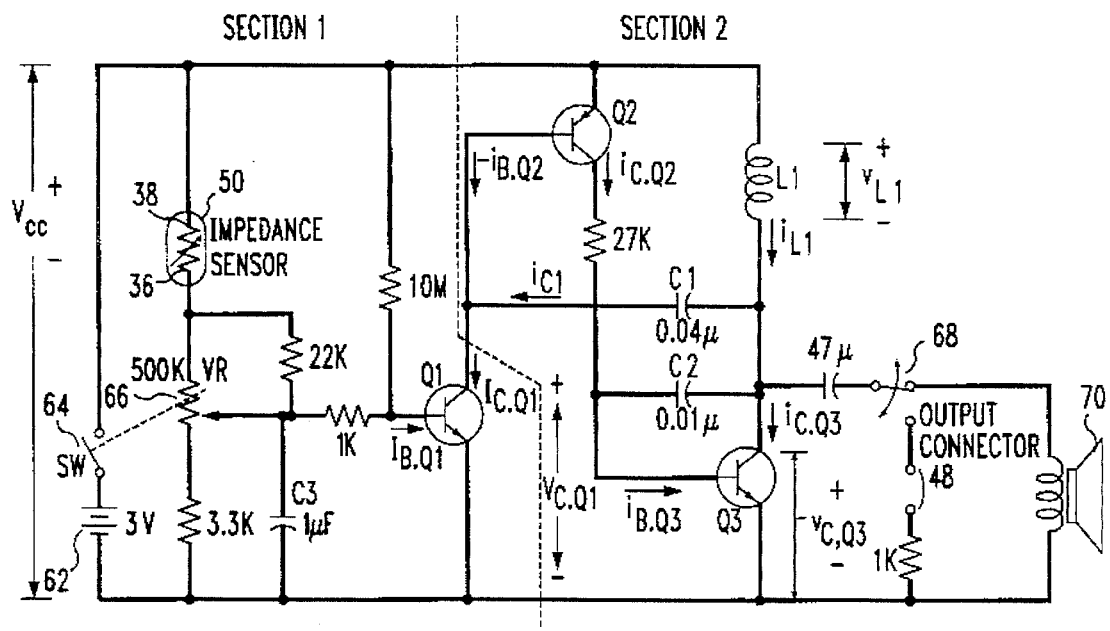
FIG. 4 illustrates a circuit within the bio-monitor.

Bio-monitor 30 contains the circuit of FIG. 4 which produces the bio-signal that indicates the impedance between points 38 and 36. The circuit consists of two sections. The first section is used to sense the impedance between contacts 38 and 36, and the second section acts as an oscillator to produce a series of ramp signals at output connector 48, where the frequency of oscillation is controlled by the first section.

The first section controls the collector current $I_{c,Q1}$ and voltage $V_{c,Q1}$ of transistor Q1 based on the impedance between contacts 38 and 36. In this embodiment, impedance sensor 50 is simply contacts 38 and 36 positioned on the speaker's skin. Since the impedance between contacts 38 and 36 changes relatively slowly in comparison to the oscillation frequency of section 2, the collector current $I_{c,Q1}$ and voltage $V_{c,Q1}$ are virtually constant as far as section 2 is concerned. The capacitor C3 further stabilizes these currents and voltages.

Section 2 acts as an oscillator. The reactive components, L1 and C1, turn transistor Q3 on and off to produce an oscillation. When the power is first turned on, $I_{c,Q1}$ turns on Q2 by drawing base current $I_{b,Q2}$. Similarly, $I_{c,Q2}$ turns on transistor Q3 by providing base current $I_{b,Q3}$. Initially there is no current through inductor L1. When Q3 is turned on, the voltage Vcc less a small saturated transistor voltage $V_{ce,Q3}$, is applied across L1. As a result, the current $I_{L1}$ increases in accordance with $$L\frac{dI_{L1}}{dt} = V_{L1}.$$

As current $I_{L1}$ increases, current $I_{c1}$ through capacitor C1 increases. Increasing the current $I_{c1}$ reduces the base current $I_{B,Q2}$ from transistor Q2 because current $I_{c,Q1}$ is virtually constant. This in turn reduces currents $I_{c,Q2}$, $I_{b,Q3}$ and $I_{c,Q3}$. As a result, more of current $I_{L1}$ passes through capacitor C1 and further reduces current $I_{c,Q3}$. This feedback causes transistor Q3 to be turned off. Eventually, capacitor C1 is fully charged and currents $I_{L1}$ and $I_{c1}$ drop to zero, and thereby permit current $I_{c,Q1}$ to once again draw base current $I_{b,Q2}$ and turn on transistors Q2 and Q3 which restarts the oscillation cycle.

Current $I_{c,Q1}$, which depends on the impedance between contacts 38 and 36, controls the frequency on duty cycle of the output signal. As the impedance between points 38 and 36 decreases, the time T between ramp signals decreases, and as the impedance between points 38 and 36 increases, the time T between ramp signals increases.

The circuit is powered by three-volt battery source 62 which is connected to the circuit via switch 64. Also included is variable resistor 66 which is used to set an operating point for the circuit. It is desirable to set variable resistor 66 at a position that is approximately in the middle of its range of adjustability. The circuit then varies from this operating point as described earlier based on the impedance between points 38 and 36. The circuit also includes switch 68 and speaker 70. When a mating connector is not inserted into connector 48, switch 68 provides the circuit's output to speaker 70 rather than connector 48.

Figure 5:
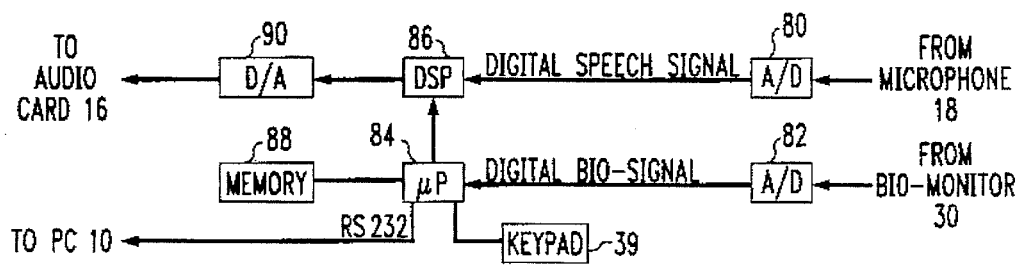
FIG. 5 is a block diagram of the preprocessor.

FIG. 5 is a block diagram of preprocessor 32. Analog-to-digital (A/D) converter 80 receives a speech or utterance signal from microphone 18, and analog-to-digital (A/D) converter 82 receives a bio-signal from bio-monitor 30. The signal from A/D 82 is provided to microprocessor 84. Microprocessor 84 monitors the signal from A/D 82 to determine what action should be taken by digital signal processor (DSP) device 86. Microprocessor 84 uses memory 88 for program storage and for scratch pad operations. Microprocessor 84 communicates with PC 10 using an RS232 interface. The software to control the interface between PC 10 and microprocessor 84 may be run on PC 10 in a multi-application environment using a software package such as a program sold under the trade name (WINDOWS) by Microsoft Corporation. The output from DSP 86 is converted back to an analog signal by digital-to-analog converter 90. After DSP 86 modifies the signal from A/D 80 as commanded by microprocessor 84, the output of D/A converter 90 is sent to audio card 16. Microprocessor 84 can be one of the widely available microprocessors such as the microprocessors available from Intel Corporation, and DSP 86 can be one of the widely available digital signal processing chips available from companies such as Texas Instruments' TMS320CXX series of devices.

It is possible to position bio-monitor 30 and preprocessor 32 on a single card that is inserted into an empty card slot in PC 10. It is also possible to perform the functions of microprocessor 84 and digital signal processor 86 using PC 10 rather than specialized hardware.

Microprocessor 84 monitors the bio-signal from A/D 82 to determine what action should be taken by DSP 86. When the signal from A/D 82 indicates that user 34 is in a more excited state, microprocessor 84 indicates to DSP 86 that it should process the signal from A/D 80 so that the pitch of the speech signal is decreased. When the bio-signal from A/D 82 indicates that the user is in a less excited or fatigued state, microprocessor 84 instructs DSP 86 to increase the pitch of the speech signal.

DSP 86 modifies the pitch of the speech signal by creating a speech model. The DSP then uses the model to recreate the speech signal with a modified pitch. The speech model is created using one of the linear predictive coding techniques which are well-known in the art. One such technique is disclosed in an Analog Device, Inc. application book entitled "Digital Signal Processing Applications Using the ADSP 2100 Family", pp. 355–372, published by Prentice-Hall, Englewood Cliffs, N.J., 1992. This technique involves modeling the speech signal as a FIR (finite impulse response) filter with time varying coefficients, where the filter is excited by a train of impulses. The time T between the impulses is a measure of pitch or fundamental frequency. The time varying coefficients may be calculated using a technique such as the Levinson-Durbin recursion which is disclosed in the above-mentioned Analog Device, Inc. publication. A time T between the impulses composing the train of impulses which excite the filter may be calculated using an algorithm such as John D. Markel's SIFT (simplified inverse filter tracking) algorithm which is disclosed in "The SIFT Algorithm for Fundamental Frequency Estimation" by John D. Markel, IEEE Transactions on Audio and Electroacoustics, Vol. AU-20, No. 5, December, 1972. DSP 86 modifies the pitch or fundamental frequency of the speech signal by changing the time T between impulses when it excites the FIR filter to recreate the speech signal. For example, the pitch may be increased by 1% by decreasing the time T between impulses by 1%.

It should be noted that the speech signal can be modified in ways other than changes in pitch. For example, pitch, amplitude, frequency and/or signal spectrum may be modified. A portion of the signal spectrum or the entire spectrum may be attenuated or amplified.

It is also possible to monitor bio-signals other than a signal indicative of the impedance between two points on a user's skin. Signals indicative of autonomic activity may be used as bio-signals. Signals indicative of autonomic activity such as blood pressure, pulse rate, brain wave or other electrical activity, pupil size, skin temperature, transparency or reflectivity to a particular electromagnetic wavelength or other signals indicative of the user's emotional state may be used.

Figure 6:
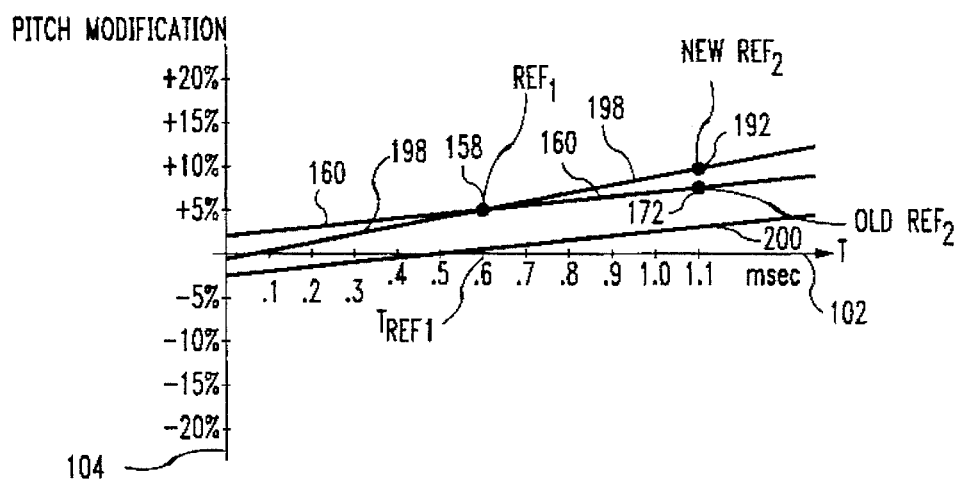
FIG. 6 illustrates a relationship between pitch modification and the bio-signal.

FIG. 6 illustrates pitch modification curves that microprocessor 84 uses to instruct DSP 86 to change the pitch of the speech signal based on the time period T associated with the bio-signal. Horizontal axis 102 indicates time period T between ramps 42 of the bio-signal and vertical axis 104 indicates the percentage change in pitch that is introduced by DSP 86.

Figure 7:
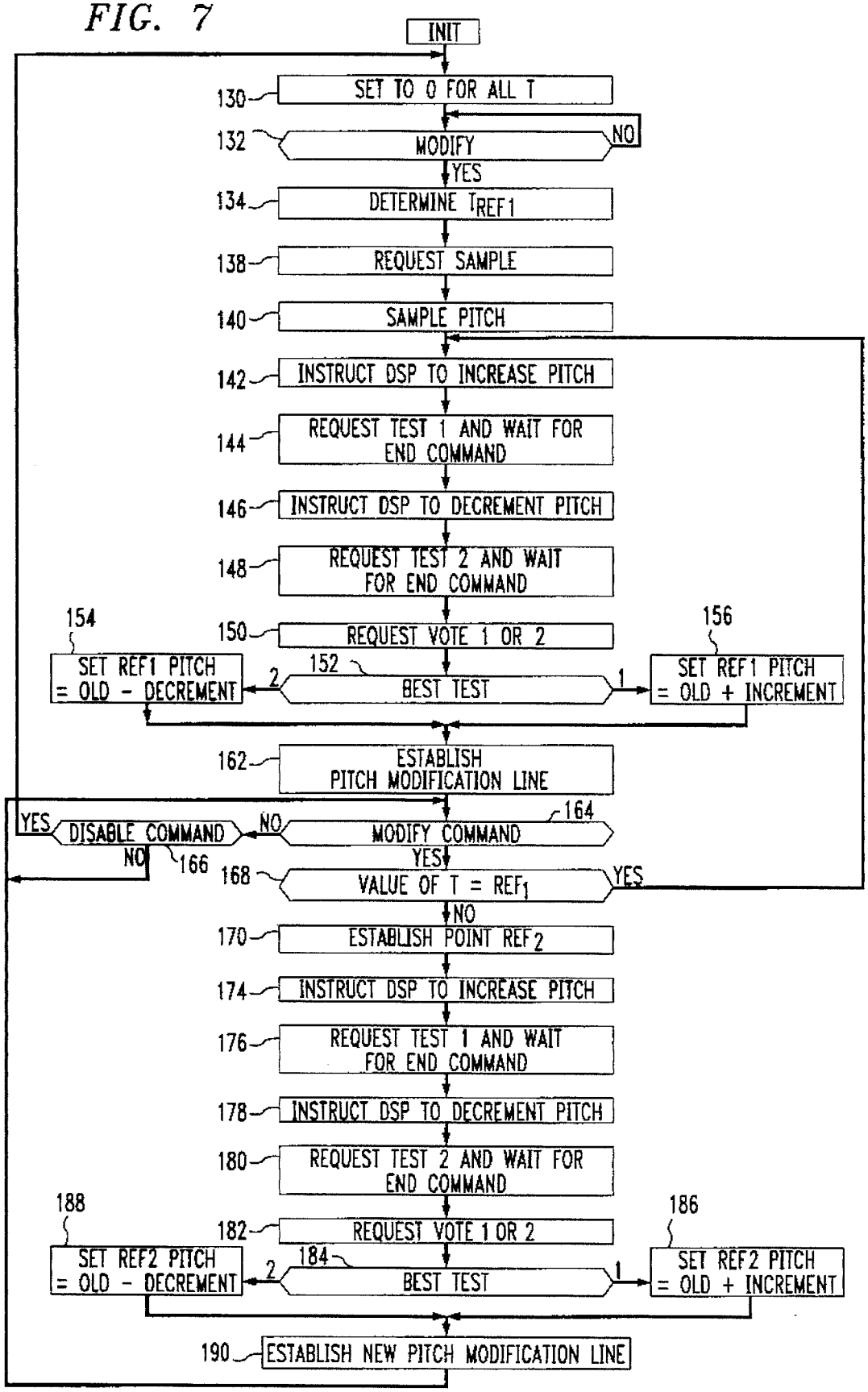
FIG. 7 is a flow chart of a calibration program.

FIG. 7 illustrates a flow chart of the commands executed by microprocessor 84 to establish an operating curve illustrated in FIG. 6. After initialization, step 130 is executed to establish a line that is co-linear with axis 102. This line indicates that zero pitch change is introduced for all values of T from the bio-signal. After step 130, decision step 132 is executed where microprocessor 84 determines whether a modify command has been received from keyboard 14 or keypad 39. If no modify command has been received, microprocessor 84 waits in a loop for a modify command. If a modify command is received, step 134 is executed to determine the value of $T=T_{ref1}$ that will be used to establish a new reference point $Ref_1$. The value $T_{ref1}$ is equal to the present value of T obtained from the bio-signal. For example, $T_{ref1}$ may equal 0.6 m sec. After determining the value $T_{ref1}$, microprocessor 84 executes step 138 which requests the user to state an utterance so that a pitch sample can be taken in step 140. It is desirable to obtain a pitch sample because that pitch sample is used as a basis for the percentage changes in pitch indicated along axis 104. In step 142, microprocessor 84 instructs DSP 86 to increase the pitch of the speech signal by an amount equal to the present pitch change associated with point $Ref._1$, plus an increment of five percent; however, smaller or larger increments may be used. (At this point, the pitch change associated with point $Ref_1$ is zero. Recall step 130.) In step 144, microprocessor 84 requests the user to run a recognition test by speaking several commands to the speech recognition system to determine if an acceptable recognition rate has been achieved. When the user completes the test, the user can indicate completion of the test to microprocessor 84 by entering a command such as "end", using keyboard 14 or keypad 39.

After executing step 144, microprocessor 84 executes step 146 in which it instructs DSP 86 to decrease the pitch of the incoming speech signal by the pitch change associated with point $Ref._1$, minus a decrement of five percent; however, smaller or larger amounts may be used. (Note that the pitch change associated with point $Ref_1$ is zero as a result of step 130). In step 148, microprocessor 84 requests that the user perform another speech recognition test and enter an "end" command when the test is completed. In step 150 microprocessor 84 requests that the user vote for the first or second test to indicate which test had superior recognition capability. In step 152 the results of the user's vote is used to select between steps 154 and 156. If test 1 was voted as best, step 156 is executed and the new percentage change associated with point $Ref_1$ is set equal to the prior value of point $Ref_1$ plus five percent or the increment that was used in step 142. If test 2 is voted best, step 154 is executed and the new percentage change value associated with $Ref_1$ is set equal to the old value of $Ref_1$ minus five percent or the decrement that was used in step 146. Determining a percentage change associated with $T=T_{ref1}$ establishes a new reference point $Ref_1$. For example, if test 1 was voted best, point $Ref_1$ is located at point 158 in FIG. 6. After establishing the position of point 158 which is the newly-established $Ref_1$, line 160 is established in step 162. Line 160 is the initial pitch modification line that is used to calculate pitch changes for different values of T from the bio-signal. Initially, this line may be given a slope such as plus five percent per millisecond; however, other slopes may be used.

After establishing this initial modification line, microprocessor 84 goes into a wait loop where steps 164 and 166 are executed. In step 164, microprocessor 84 checks for a modify command, and in step 166, it checks for a disable command. If a modify command is not received in step 164, the processor checks for the disable command in step 166. If a disable command is not received, microprocessor returns to step 164, and if a disable command is received, the microprocessor executes step 130 which sets the change in pitch equal to zero for all values of T from the bio-signal. The processor stays in this loop of checking for modify and disable commands until the user becomes dissatisfied with the recognition rate resulting from the preprocessing of the speech signal using curve 160.

If in step 164 a modify command is received, step 168 is executed. In step 168, the value of T is determined to check if the value of T is equal to, or nearly equal to the value $T_{ref1}$ of point $Ref_1$. If the value of T corresponds to $Ref_1$, step 142 is executed. If the value of T does not correspond to $Ref_1$, step 170 is executed. In step 170, the value of $T_{ref2}$ for a new reference point $Ref_2$ is established. For the purposes of an illustrative example, we will assume that $T_{ref2}$=1.1 m sec. In reference to FIG. 6, this establishes point $Ref_2$ as point 172 on line 160. In step 174, microprocessor 84 instructs the DSP 86 to increase the pitch change associated with point $Ref_2$ by plus 2.5 percent (other values of percentage may be used). (Other values of percentage may be used) In step 176, the user is requested to perform a recognition test and to enter the "end" command when completed. In step 178, microprocessor 84 instructs DSP 86 to decrease the pitch of the speech signal by an amount equal to the pitch change associated with $Ref_2$ minus 2.5 percent. In step 180, the user is again requested to perform a recognition test and to enter an "end" command when completed. In step 182 the user is requested to indicate whether the first or second test had the most desirable results. In step 184, microprocessor 84 decides to execute step 186 if test 1 was voted best, and step 188, if test 2 was voted best. In step 186, microprocessor 84 sets the percentage change associated with point $Ref_2$ to the prior value associated with $Ref_2$ plus 2.5 percent or the increment that was used in step 174. In step 188, the percentage change associated with $Ref_2$ is set equal to the prior value associated with $Ref_2$ minus 2.5 percent or the decrement that was used in step 178. After completing steps 186 or 188, step 190 is executed. In step 190, a new pitch modification line is established. The new line uses the point associated with $Ref_1$ and the new point associated with $Ref_2$. For example, if it is assumed that the user selected test 1 in step 184, the new point associated with $Ref_2$ is point 192 of FIG. 6. The new pitch conversion line is now line 198 which passes through points 192 and 158. After executing step 190 microprocessor 84 returns to the looping operation associated with steps 164 and 166.

It should be noted that a linear modification line has been used; however, it is possible to use non-linear modification lines. This can be done by using points 158 and 196 to establish a slope for a line to the right of point 158, and by using another reference point to the left of point 158 to establish a slope for a line extending to the left of point 158. It is also possible to place positive and negative limits on the maximum percentage pitch change. When the pitch modification line approaches these limits, they can approach it asymptotically, or simply change abruptly at the point of contact with the limit.

It is also possible to use a fixed modification curve, such as curve 200, and then adjust variable resistor 66 until an acceptable recognition rate is achieved.

What is claimed:

1. A method for using a speech recognition system to recognize a user's utterance, comprising the steps of:

converting the utterance into a signal;

using a bio-signal derived from the user to produce a modified signal from said signal; and providing said modified signal to the speech recognition system.

2. The method of claim 1, wherein said step of using said bio-signal to produce said modified signal comprises modifying a microphone's response to said utterance in response to said bio-signal.

3. The method of claim 2, wherein a frequency response of said microphone is modified in response to said bio-signal.

4. The method of claim 2, wherein a gain of said microphone is modified in response to said bio-signal.

5. The method of claim 1, wherein said step of using said bio-signal to produce said modified signal comprises using said bio-signal to modify a pitch of said signal.

6. The method of claim 1, wherein said step of using said bio-signal to produce said modified signal comprises using said bio-signal to modify an amplitude of said signal.

7. The method of claim 1, wherein said step of using said bio-signal to produce said modified signal comprises using said bio-signal to modify a spectrum of said signal.

8. The method of claim 7, wherein a portion of said spectrum is attenuated.

9. The method of claim 7, wherein a portion of said spectrum is amplified.

10. The method of claim 1, wherein said step of using said bio-signal to produce said modified signal comprises modifying said signal based on a frequency of said bio-signal.

11. The method of claim 1, wherein said step of using said bio-signal to produce said modified signal comprises modifying said signal based on a periodicity of said bio-signal.

12. The method of claim 1, wherein said step of using said bio-signal to produce said modified signal comprises modifying said signal based on a amplitude of said bio-signal.

13. The method of claim 1, wherein said bio-signal is related to autonomic activity.

14. The method of claim 1, wherein said bio-signal is related to the user's emotional state.

15. The method of claim 1, wherein said bio-signal is related to impedance.

16. The method of claim 1, wherein said bio-signal is related to pulse.

17. The method of claim 1, whereto said bio-signal is related to blood pressure.

18. The method of claim 1, wherein said bio-signal is related to electrical activity.

19. The method of claim 1, wherein said bio-signal is related to pupil size.

20. The method of claim 1, wherein said bio-signal is related to temperature.

21. The method of claim 1, wherein said bio-signal is related to skin transparency.

22. The method of claim 1, wherein said bio-signal is related to reflectivity.

23. A method for using a speech recognition system to recognize a user's utterance, comprising the steps of:

converting the utterance into a signal;

using a bio-signal derived from the user to produce a modified signal by modifying a pitch of said signal, said bio-signal being related to autonomic activity; and providing said modified signal to the speech recognition system.

24. A method for using a speech recognition system to recognize a user's utterance, comprising the steps of:

converting the utterance into a signal;

using a bio-signal derived from the user to produce a modified signal by modifying a spectrum of said signal, said bio-signal being related to autonomic activity; and providing said modified signal to the speech recognition system.

\* \* \* \* \*